United States Patent
Nair et al.

(10) Patent No.: US 11,595,321 B2
(45) Date of Patent: Feb. 28, 2023

(54) CLUSTER CAPACITY MANAGEMENT FOR HYPER CONVERGED INFRASTRUCTURE UPDATES

(71) Applicant: VMWARE, INC., Palo Alto, CA (US)

(72) Inventors: Vikram Nair, Palo Alto, CA (US); Rahul Chandrasekaran, Los Altos, CA (US); Anant Agarwal, San Jose, CA (US); Piyush Parmar, Bangalore (IN); Aalap Desai, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/408,594

(22) Filed: Aug. 23, 2021

(65) Prior Publication Data

US 2023/0008011 A1    Jan. 12, 2023

(30) Foreign Application Priority Data

Jul. 6, 2021  (IN) .............................. 202141030307

(51) Int. Cl.
*H04L 47/62* (2022.01)
*H04L 47/726* (2022.01)
*H04L 47/78* (2022.01)
*H04L 47/762* (2022.01)
*H04L 47/80* (2022.01)

(52) U.S. Cl.
CPC .......... *H04L 47/762* (2013.01); *H04L 47/726* (2013.01); *H04L 47/781* (2013.01); *H04L 47/801* (2013.01)

(58) Field of Classification Search
CPC ... H04L 47/762; H04L 47/726; H04L 47/781; H04L 47/801; H04L 29/02; H04L 12/42; H04L 29/08; H04L 12/869; G06F 13/14
See application file for complete search history.

(56) References Cited

U.S. PATENT DOCUMENTS

| | | |
|---|---|---|
| 6,016,505 A | 1/2000 | Badovinatz et al. |
| 6,026,426 A | 2/2000 | Badovinatz et al. |
| 6,338,079 B1 | 1/2002 | Kanamori et al. |
| 6,446,218 B1 | 9/2002 | D Souza |
| 6,968,359 B1 | 11/2005 | Miller et al. |
| 6,973,500 B1 | 12/2005 | Yamamoto et al. |
| 7,039,694 B2 | 5/2006 | Kampe et al. |
| 7,197,632 B2 | 3/2007 | Rao et al. |
| 7,296,268 B2 | 11/2007 | Darling et al. |
| 7,320,085 B2 | 1/2008 | Bain |
| 7,516,221 B2 | 4/2009 | Souder et al. |
| 7,571,206 B2 | 8/2009 | Koning et al. |
| 7,644,144 B1 | 1/2010 | Horvitz et al. |

(Continued)

OTHER PUBLICATIONS

Auto Scaling, User Guide. Amazon web services. 2016.

*Primary Examiner* — Aftab N. Khan
(74) *Attorney, Agent, or Firm* — Thomas Horstemeyer, LLP

(57) ABSTRACT

Disclosed are various implementations of cluster capacity management for infrastructure updates. In some examples, cluster hosts for a cluster can be scheduled for an update. A component of a datacenter level resource scheduler can analyze cluster specific resource usage data to identify a cluster scaling decision for the cluster. The datacenter level resource scheduler transmits an indication that the resource scheduler is successfully invoked. Cluster hosts can then be updated.

20 Claims, 5 Drawing Sheets

(56) References Cited

U.S. PATENT DOCUMENTS

| | | |
|---|---|---|
| 7,739,541 B1 | 6/2010 | Rao et al. |
| 7,739,677 B1 | 6/2010 | Kekre et al. |
| 7,739,687 B2 | 6/2010 | Newport |
| 7,774,010 B2 | 8/2010 | Kokkonen et al. |
| 8,175,863 B1 | 5/2012 | Ostermeyer et al. |
| 8,316,110 B1 | 11/2012 | Deshmukh et al. |
| 8,738,972 B1 | 5/2014 | Bakman et al. |
| 8,966,318 B1 | 2/2015 | Shah |
| 9,524,389 B1 | 12/2016 | Roth |
| 9,696,985 B1 | 7/2017 | Gupta et al. |
| 9,697,028 B1 | 7/2017 | Allen |
| 9,874,924 B1 | 1/2018 | Li |
| 9,928,092 B1 | 3/2018 | Pagl et al. |
| 10,567,288 B1 * | 2/2020 | Mutnuru .............. H04L 41/0893 |
| 2002/0042830 A1 | 4/2002 | Bose et al. |
| 2002/0078263 A1 * | 6/2002 | Darling ................ G06F 9/5061 719/331 |
| 2003/0056013 A1 | 3/2003 | Laschkewitsch et al. |
| 2004/0015581 A1 | 1/2004 | Forbes |
| 2004/0039815 A1 | 2/2004 | Evans et al. |
| 2004/0148333 A1 | 7/2004 | Manion et al. |
| 2004/0153558 A1 | 8/2004 | Gunduc et al. |
| 2004/0162870 A1 | 8/2004 | Matsuzaki et al. |
| 2005/0019311 A1 | 1/2005 | Holaday et al. |
| 2005/0102676 A1 | 5/2005 | Forrester |
| 2005/0160133 A1 | 7/2005 | Greenlee et al. |
| 2005/0160143 A1 | 7/2005 | Bae et al. |
| 2005/0193099 A1 | 9/2005 | Reus et al. |
| 2005/0251802 A1 | 11/2005 | Bozek et al. |
| 2006/0005062 A1 | 1/2006 | Sagi |
| 2006/0037016 A1 | 2/2006 | Saha et al. |
| 2006/0085530 A1 | 4/2006 | Garrett |
| 2006/0143495 A1 * | 6/2006 | Bozak .................. G06F 9/5061 714/4.1 |
| 2006/0229927 A1 | 10/2006 | Humphries et al. |
| 2006/0248159 A1 | 11/2006 | Polan |
| 2007/0027452 A1 | 2/2007 | Varner et al. |
| 2007/0233698 A1 | 10/2007 | Sundar et al. |
| 2008/0000532 A1 | 1/2008 | Wagner et al. |
| 2008/0005291 A1 | 1/2008 | Bae et al. |
| 2008/0189700 A1 | 8/2008 | Schmidt et al. |
| 2008/0244595 A1 | 10/2008 | Eilam et al. |
| 2008/0256557 A1 | 10/2008 | Goft et al. |
| 2009/0077558 A1 | 3/2009 | Arakawa et al. |
| 2009/0113034 A1 | 4/2009 | Krishnappa et al. |
| 2009/0138752 A1 | 5/2009 | Graham et al. |
| 2009/0144800 A1 | 6/2009 | Black-Ziegelbein et al. |
| 2010/0010699 A1 | 1/2010 | Taguchi et al. |
| 2010/0115621 A1 | 5/2010 | Staniford et al. |
| 2010/0325197 A1 | 12/2010 | Heim |
| 2010/0325278 A1 | 12/2010 | Heim et al. |
| 2010/0325279 A1 | 12/2010 | Heim |
| 2010/0325284 A1 | 12/2010 | Heim et al. |
| 2010/0333089 A1 | 12/2010 | Talwar et al. |
| 2011/0072208 A1 | 3/2011 | Gulati et al. |
| 2011/0131569 A1 | 6/2011 | Heim |
| 2011/0161957 A1 | 6/2011 | Bernardi et al. |
| 2011/0247072 A1 | 10/2011 | Staniford et al. |
| 2012/0084774 A1 | 4/2012 | Post et al. |
| 2012/0102190 A1 | 4/2012 | Durham et al. |
| 2012/0198447 A1 | 8/2012 | Osogami et al. |
| 2013/0005474 A1 | 1/2013 | Bethke et al. |
| 2013/0014499 A1 | 1/2013 | Gray, Jr. |
| 2013/0017378 A1 | 1/2013 | Doytcheva et al. |
| 2013/0020501 A1 | 1/2013 | McKinney |
| 2013/0031165 A1 | 1/2013 | Pantos et al. |
| 2013/0080559 A1 | 3/2013 | Rao et al. |
| 2013/0111033 A1 | 5/2013 | Mao et al. |
| 2013/0262664 A1 | 10/2013 | Yamada et al. |
| 2013/0311659 A1 * | 11/2013 | Curran .................. G06F 21/604 709/225 |
| 2013/0311988 A1 | 11/2013 | Boss et al. |
| 2014/0074987 A1 | 3/2014 | Martz et al. |
| 2014/0196037 A1 | 7/2014 | Kartik |
| 2014/0279884 A1 | 9/2014 | Dantkale et al. |
| 2014/0282504 A1 | 9/2014 | O'Donnell et al. |
| 2014/0304414 A1 | 10/2014 | Yengalasetti et al. |
| 2015/0058861 A1 | 2/2015 | Zheng et al. |
| 2015/0212860 A1 | 7/2015 | Ali et al. |
| 2015/0215234 A1 * | 7/2015 | Shanmuganathan ........................ H04L 41/5019 709/226 |
| 2015/0324236 A1 | 11/2015 | Gopalan et al. |
| 2015/0331704 A1 | 11/2015 | Abali et al. |
| 2016/0041889 A1 | 2/2016 | Banerjee et al. |
| 2016/0094643 A1 | 3/2016 | Jain et al. |
| 2016/0203015 A1 | 7/2016 | Joshi et al. |
| 2016/0205519 A1 | 7/2016 | Patel et al. |
| 2016/0283270 A1 * | 9/2016 | Amaral .................. G06F 9/5027 |
| 2016/0314012 A1 | 10/2016 | Rong et al. |
| 2016/0371127 A1 | 12/2016 | Antony et al. |
| 2016/0380832 A1 * | 12/2016 | Purushotham .......... H04L 41/40 709/226 |
| 2017/0048163 A1 | 2/2017 | Pan et al. |
| 2017/0318092 A1 | 11/2017 | Maredia et al. |
| 2018/0006935 A1 * | 1/2018 | Mutnuru ............. H04L 67/1001 |
| 2018/0007005 A1 | 1/2018 | Chanda et al. |
| 2018/0095776 A1 | 4/2018 | Tsai et al. |
| 2019/0190824 A1 * | 6/2019 | Mutnuru .................. H04L 45/22 |
| 2019/0230043 A1 * | 7/2019 | Kommula ............. H04L 47/803 |
| 2019/0288914 A1 | 9/2019 | Celozzi et al. |
| 2021/0226871 A1 * | 7/2021 | Cheng ........................ G06F 8/65 |
| 2021/0377117 A1 * | 12/2021 | Kanevsky ............... H04L 41/40 |
| 2022/0217097 A1 * | 7/2022 | Weissblat ............ H04L 67/1097 |

* cited by examiner

CLUSTER CAPACITY MANAGEMENT FOR HYPER CONVERGED INFRASTRUCTURE UPDATES

RELATED APPLICATION

Benefit is claimed under 35 U.S.C. 119(a)-(d) to Foreign Application Serial No. 202141030307 filed in India entitled "CLUSTER CAPACITY MANAGEMENT FOR HYPER CONVERGED INFRASTRUCTURE UPDATES", on Jul. 6, 2021, by VMware, Inc., which is herein incorporated in its entirety by reference for all purposes.

BACKGROUND

Enterprises can manage configurations and compliance of enterprise components that are used for enterprise productivity and have access to enterprise resources. These components can include individual devices, as well as infrastructure, software, and other products that can be provided as a service. Enterprises often organize groups of computers or hosts into multiple clusters of a software defined datacenter (SDDC). Clusters of hosts can be used to host applications in a coordinated, yet distributed manner. Hosts and other devices of the SDDC can execute host management components that enable management options when used in conjunction with management components that govern or manage the overall SDDC.

Enterprises and service providers may desire to update SDDC management components, for example, in response to changing work conditions and security considerations. Performing an update can consume cluster resources. However, a failure or drop in quality of service for enterprise applications and services can be very costly. When an update is scheduled for a SDDC, one solution can be to add one host to every cluster, then initiate the update, and once each host on each cluster is completed, that same added host is removed. However, this can be lossy and costly, since clusters can be very large or very small. Smaller clusters can be given the additional host for a long period of time while larger clusters are being updated. In the case of a failure, all cluster updates can be halted, extending the time the additional hosts are provided for each cluster. The longer the host is maintained in a cluster, more data and processes can be assigned to that host, which increases the processing and network resource cost of removal. As a result, there is a need for improved cluster capacity management for updates.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to cluster capacity management for updates to hyper-converged infrastructures. A software defined datacenter (SDDC) can organize groups of computers or hosts into multiple clusters. Clusters of hosts can be used to host applications in a coordinated, yet distributed manner. Hosts and other devices of the SDDC can execute host level management components that enable management options when used in conjunction with other management components including SDDC level management components and a cloud management service.

Enterprises and service providers may desire to update SDDC management components, for example, in response to changing work conditions and security considerations. Performing an update can consume cluster resources. However, a failure or drop in quality of service for enterprise applications and services can be very costly. When an update is scheduled for a SDDC, one solution can be to add one host to every cluster, then initiate the update, and once each host on each cluster is completed, that same added host is removed.

This can be lossy and costly, since clusters can include a wide variety of sizes or numbers of hosts. Smaller clusters can be allocated to the additional host for a long period of time while larger clusters are being updated. In the case of a failure, all cluster updates can be halted, extending the time the additional hosts are provided for each cluster. In a hyper converged infrastructure, a host can include compute, memory, network, and storage. The longer the host is maintained in a cluster, the more data and processes can be assigned to that host, and the more data that can be transferred into storage and memory. This can increase the resource cost of removal, including processing and data transfer costs. Some clusters depending on their resource consumption may not require additional resources to be added if existing resources are sufficient to manage the upgrade without impacting drop in quality of the workloads, as a result, the addition of a host in that scenario can be associated with a loss in efficiency. As a result, there is a need for improved cluster capacity management for updates. The present disclosure provides mechanisms that provide cluster capacity management for updates to hyper-converged infrastructures.

Figure 1:
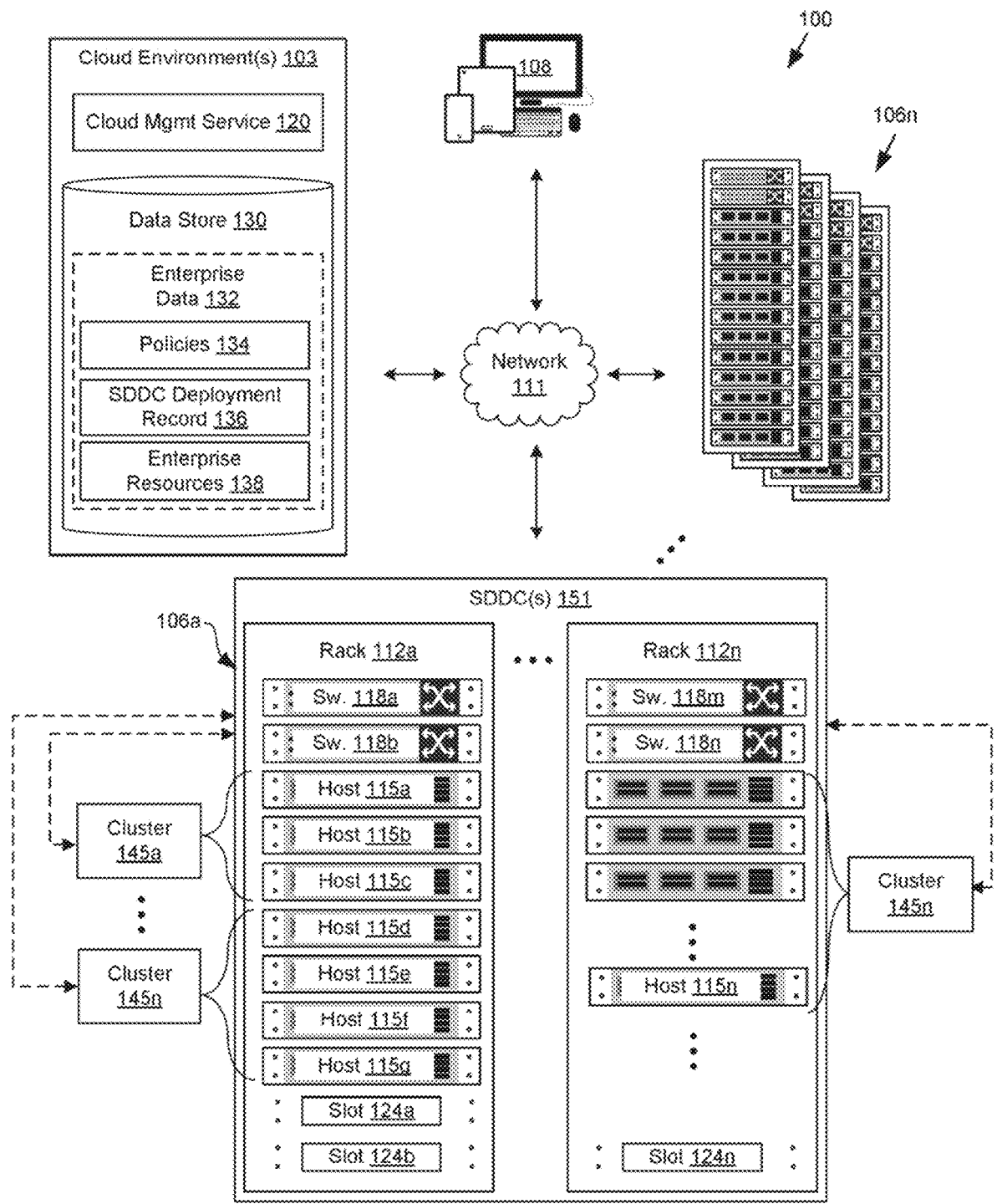
FIG. 1 is a drawing of an example of a networked environment capable of cluster capacity management for infrastructure updates.

With reference to FIG. 1, an example of a networked environment 100 is shown. The networked environment 100 can include a cloud environment 103, various computing sites 106a . . . 106n, and one or more client devices 108 in communication with one another over a network 111. The network 111 can include wide area networks (WANs) and local area networks (LANs). These networks can include wired or wireless components, or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 111 can also include a combination of two or more networks 111. Examples of networks 111 can include the Internet, intranets, extranets, virtual private networks (VPNs), and similar networks.

In various embodiments, the computing sites 106 can include a plurality of devices installed in racks 112, such as racks 112a . . . 112n, which can make up a server bank, aggregate computing system, or a computer bank in a data center or other like facility. In some examples, a computing site 106 can include a high-availability computing site 106. A high-availability computing site 106 is a group of computing devices that act as a single system and provide a continuous uptime. The devices in the computing sites 106 can include any number of physical machines, virtual machines, virtual appliances, and software, such as operating systems, drivers, hypervisors, scripts, and applications.

In some examples, the cloud environment 103 can include an enterprise computing environment that includes hundreds or even thousands of physical machines, virtual machines, and other software implemented in devices stored in racks 112, distributed geographically and connected to one another through the network 111. It is understood that any virtual machine or virtual appliance is implemented using at least one physical device.

The devices in the racks 112 can include, for example, memory and storage devices, hosts 115a . . . 115n, switches 118a . . . 118n, and other computing or network devices. These devices can include graphics cards containing graphics processing units (GPUs), central processing units (CPUs), power supplies, network interfaces, memory, storage, and similar devices. The devices, such as hosts 115 and switches 118, can have dimensions suitable for quick installation in slots 124, such as slots 124a . . . 124c, on the racks 112. The hosts 115 can include physical hardware and installed software to create and manage a virtualization infrastructure. The physical hardware for a host 115 can include a CPU, graphics card, data bus, memory, and other components. In some examples, the hosts 115 can include a pre-configured, hyper-converged computing device of a hyper-converged infrastructure. A hyper-converged infrastructure can host enterprise processes and services using hyper-converged computing devices, each of which can include pre-tested, pre-configured, and pre-integrated compute, memory, storage, and network hardware resources or components, and can be positioned in an enclosure installed in a slot 124 on a rack 112.

Additionally, where a host 115 includes an instance of a virtual machine, the host 115 can be referred to as a "host," while the virtual machine can be referred to as a "guest." Each host 115 that acts as a host in the networked environment 100, and thereby includes one or more guest virtual machines, can also include a hypervisor. In some examples, the hypervisor can be installed on a host 115 to support a virtual machine execution space within which one or more virtual machines can be concurrently instantiated and executed. In some examples, the hypervisor can include the VMware ESX™ hypervisor, the VMware ESXi™ hypervisor, or similar hypervisor. It is understood that the computing sites 106 or datacenters are scalable, meaning that the computing sites 106 in the networked environment 100 can be scaled dynamically to include additional hosts 115, switches 118, and other components, without degrading performance of the virtualization environment. Moreover, the additional hosts 115 and switches 118 need not be located in the same rack 112 or the same facility. For example, a computing site 106 could be formed from a collection of hosts 115 and switches 118 located in multiple racks 112 positioned in one or more data centers. In some examples, the hosts in the computing site 106 are monitored and, in the event of a failure, the virtual machines or virtual appliances on a failed host are restarted on alternate hosts.

In various examples, when a host 115 (e.g., a physical computing device) is added to a computing site 106, a management agent application or suite of host level management components can be installed to the host and configured to communicate with other management components in the computing site 106 and across multiple computing sites. Some of the hosts in the computing site 106 can be designated as primary hosts, and other hosts in the computing site 106 can be designated as secondary hosts. The primary hosts, for example, can maintain and replicate states of the computing site 106 and can be used to initiate failover actions. Any host that joins the computing site 106 can communicate with a host, such as an existing primary host, to complete its configuration.

The cloud environment 103 can include, for example, one or more of the hosts 115 or any other system providing computing capability. The cloud environment 103 can include one or more computing devices that are arranged, for example, in one or more server banks, computer banks, computing clusters, or other arrangements. The cloud environment 103 can include a grid computing resource or any other distributed computing arrangement. The computing devices can be located in a single installation or can be distributed among many different geographical locations. Although shown separately from the computing sites 106, it is understood that in some examples, the computing sites 106 can provide or be integrated with the cloud environment 103.

The cloud environment 103 can include or be operated as one or more virtualized computer instances. For purposes of convenience, the cloud environment 103 is referred to herein in the singular. Even though the cloud environment 103 is referred to in the singular, it is understood that a plurality of cloud environments 103 can be employed in the various arrangements as described above. As the cloud environment 103 communicates with the computing sites 106 and client devices 108 for end users over the network 111, sometimes remotely, the cloud environment 103 can be described as a remote cloud environment 103 in some examples. Additionally, in some examples, the cloud environment 103 can be implemented in hosts 115 of a rack 112 and can manage operations of a virtualized computing environment. Hence, in some examples, the cloud environment 103 can be referred to as a management cluster for the computing sites 106.

The cloud environment 103 can include a data store 130. The data store 130 can include memory of the cloud environment 103, mass storage resources of the cloud environment 103, or any other storage resources on which data can be stored by the cloud environment 103. The data store 130 can include memory of the hosts 115 in some examples. In some examples, the data store 130 can include one or more relational databases, object-oriented databases, hierarchical databases, hash tables or similar key-value data stores, as well as other data storage applications or data structures. The data stored in the data store 130, for example, can be associated with the operation of the various services or functional entities described below. The data store 130 can include a data store of the cloud environment 103. The data store 130 can include enterprise data 132 for a number of enterprises. The enterprise data 132 can include enterprise-specific policies 134, a SDDC deployment record 136, enterprise resources 138, and other data.

Various applications can be executed on the cloud environment 103. For example, a cloud management service 120 and other cloud level software components can be executed by the cloud environment 103. Although the functionality provided by the cloud management service 120 is discussed as being provided by a single service, the functionality attributed to the cloud management service 120 can be split across multiple applications or services. For example, some of the functionality attributed to the cloud management service 120 might be implemented by a first application or process, while other functionality might be implemented by other applications or processes. Other applications, services, processes, systems, engines, or functionality not discussed in detail herein can also be executed or implemented by the cloud environment 103.

Various physical and virtual components of the computing sites 106 can process workloads using workload domains, environments, or clusters 145a . . . 145f, which can include a defined logical set of hardware hosts 115 that includes compute, storage, and networking capabilities. Individual clusters 145 can include multiple hosts 115 within one or more computing sites 106, and a computing site 106 can be assigned multiple clusters 145. The clusters 145 can be associated with workloads such as virtual machines and other software executing on the hosts 115 in association with an enterprise. An enterprise can administer multiple clusters 145. Multiple clusters 145 can be defined within a single rack 112, and clusters 145 can span multiple racks 112 and multiple computing sites 106.

The cloud management service 120 can generate a management console or other administrative user interface for administration of hosts 115 deployed or assigned to an enterprise, policies 134, as well as software resources, data resources, and other enterprise resources 138. For example, the cloud management service 120 can provide a user interface to create and modify the policies 134, enterprise resources 138, cluster configurations such as a number of and identifications of hosts 115 assigned to each of the clusters 145, and SDDC configurations such as a number of and identifications of clusters 145 assigned to each SDDC 151. The cluster configurations, policies, and software resources, and other enterprise resources 138 can be stored in a SDDC deployment record 136. An enterprise identifier can be associated with one or more SDDC 151.

The cloud management service 120 can also track billable and unbillable capacity according to host 115, and according to compute, memory, network, data storage, and other hardware resources provided by each host 115. This information can be stored in the SDDC deployment record 136. For example, if management components are to be updated, a host 115 can be added to a cluster 145 to provide additional capacity for update purposes. The additional host 115, or the additional resource capacity provided by the additional host 115 can be indicated as an unbillable host or otherwise as unbillable capacity, since the additional capacity can be added in order to maintain quality of service for the set of applications and processes running at update time. However, once the update is completed, if the enterprise has increased the applications and processes, or has otherwise increased resource usage, then the additional host 115 or additional capacity can be converted into billable capacity, even though it was initially added for update purposes. This can increase the reliability and continuity of the quality of service during and after an update. The SDDC deployment record 136 can also include preferences and policies that indicate whether additional billable hosts 115 or billable capacity can be automatically added. The cloud management service 120 can reference these preferences and allow or disallow recommendations to add billable hosts 115 or capacity.

The policies 134 can include legacy and group policies, profiles, scripts, baselines, and other rules. Policies 134 can be enforced by management components, agents, and other instructions executed by a virtual or physical device of a cluster 145. In some cases, the policies 134 can be enforced using an operating system. Kernel-space and/or user-space management components, agents, and other instructions can directly enforce or use an operating system to enforce settings and parameters associated with the policies 134.

Figure 2:
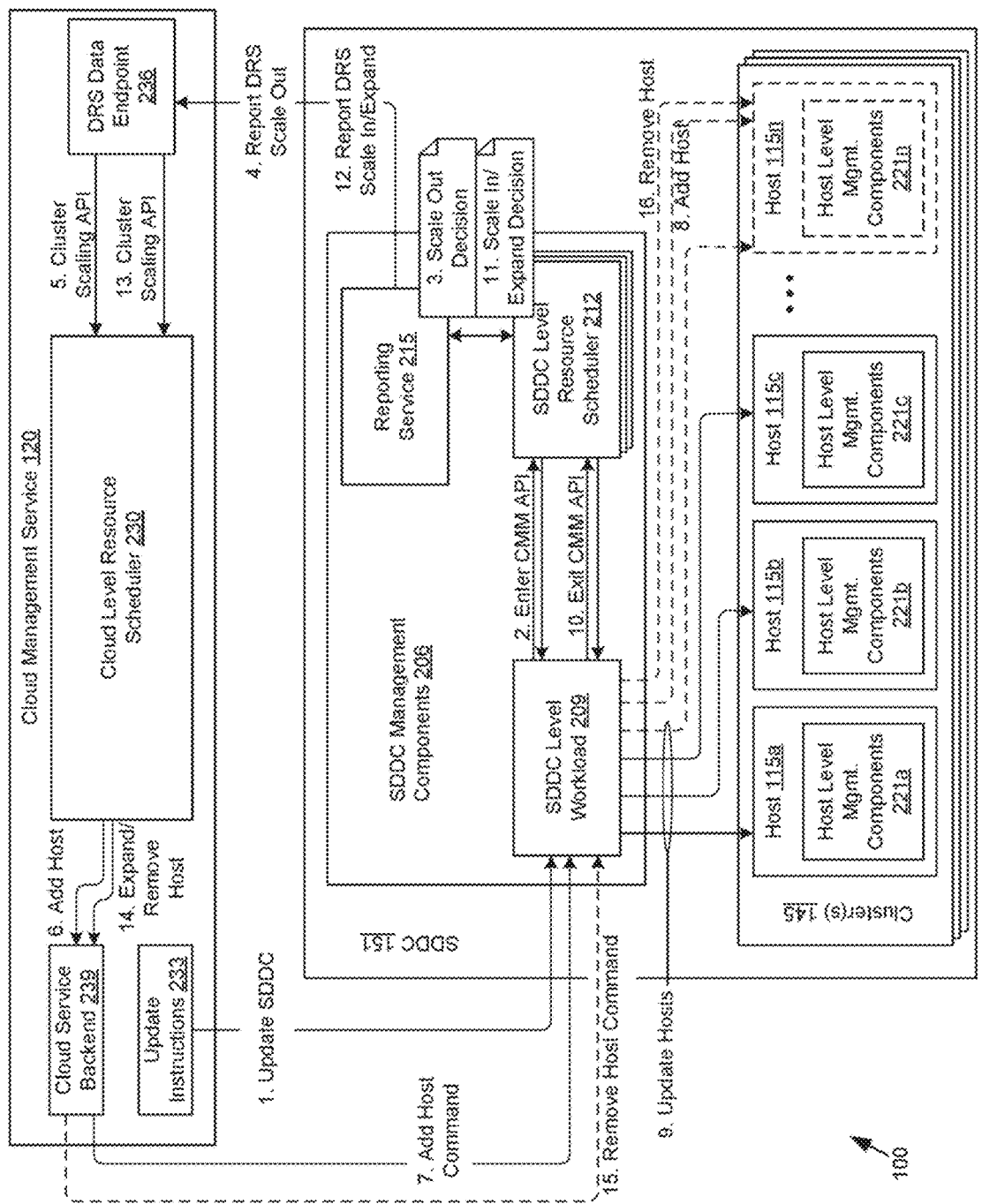
FIG. 2 is a drawing of an example of a cluster capacity management process for infrastructure updates using components of the networked environment, according to the present disclosure.

FIG. 2 shows an example of a cluster capacity management process for infrastructure updates using components of the networked environment 100. In this example, the networked environment 100 includes the cloud management service 120, SDDC management components 206, and hosts 115a . . . 115n.

The SDDC management components 206 can include a SDDC level workload 209, a SDDC level resource scheduler 212, and one or more reporting services 215. The SDDC management components 206 can be considered components of a control plane for the SDDC 151. The SDDC level workload 209, while referred to in the singular for convenience, can refer to one or more workloads corresponding to various management functionalities. The SDDC level workload can include a management component that receives deliveries of commands and instructions from the cloud management service 120 for implementation on the SDDC 151. As a result, the SDDC level workload 209 can include or be referred to as a point of delivery. The SDDC level workload 209 can include executable instructions executed using one or more hosts 115 of a SDDC 151. In some cases, the SDDC management components 206 can be executed using a dedicated management cluster 145.

While the hosts 115 can be in a particular cluster 145, SDDC level workload 209 and related workloads can perform an update of the hosts 115 of any cluster 145 of the SDDC 151. Generally, the SDDC level workload 209 can receive a command to update all clusters 145 of the SDDC 151 and can guide the update operation. The update can include an update to newer features, patches, additions, and other software and firmware updates associated with host level management components 221a . . . 221n.

The SDDC level resource scheduler 212 can include a portion of a distributed resource scheduling (DRS) service. The SDDC level resource scheduler 212 can monitor the hosts 115 of each cluster 145 of the hyper-converged SDDC 151 for resource usage, total resource capacity, and available capacity for each host 115, for the cluster 145, and for the SDDC 151 overall. The SDDC level resource scheduler 212 can initially place, migrate, and remove enterprise processes that are to be executed using the cluster 145. The SDDC level resource scheduler 212 can also expand and contract the number of hosts 115 that are deployed by or provisioned to the cluster 145.

The reporting service 215 can include a SDDC level or cluster level monitoring and reporting process that communicates DRS decisions and other DRS data from the SDDC level resource scheduler 212 to the cloud level resource scheduler 230. The reporting service 215 can transmit this information to a URL associated with a DRS data endpoint 236. In some cases, the DRS data endpoint 236 can be associated with a polling engine that polls or requests the DRS data, and the reporting service 215 can transmit the DRS data in response to a request.

In this example, the hosts 115a, 115b, and 115c can represent an initial set of hosts 115 of a cluster 145, and the host 115n can represent an additional host 115 that can be added for update purposes if the set of hosts 115 do not have sufficient capacity to perform an update process in addition to the existing set of enterprise workloads executed using the set of hosts 115. The set of hosts 115 can include any number of hosts 115, although discussed as the hosts 115a, 115b, and 115c for discussion purposes. The hosts 115a . . . 115n can execute corresponding host level management components 221a . . . 221n. An update workflow can be performed in a rolling fashion across hosts 115 in a cluster where only one host 115 is upgraded at a time. Also, when a host 115 is upgraded all the workloads or applications running on that host 115 are temporarily migrated to other hosts 115 in the cluster until the upgrade is performed and completed. This can result in capacity requirements for one host 115 to be added in the cluster during the upgrade process.

The host level management components 221 can include a hypervisor such as VMware ESXi™ that enables virtualization and management options including DRS, high availability for virtual machines and other workloads, fault tolerance, and virtual machine and workload migration. The host level management components 221 can also include a networking and security virtualization component such as VMware NSX®, and a datastore virtualization component such as VMware vSAN™.

The host level management components 221 can include executable software components that provide virtualization of the compute, memory, network, and data storage resources provided by the hosts 115. The host level management components 221a can provide virtualization of the compute, memory, network, and data storage resources provided by the host 115a. The host level management components 221b can provide virtualization of the compute, memory, network, and data storage resources provided by the host 115b, and so on. The host level management components 221a . . . 221n can provide virtualization of the collective compute, memory, network, and data storage resources of the hosts 115 of a cluster 145.

The cloud management service 120 can include a cloud level resource scheduler 230, update instructions 233, a DRS data endpoint 236, a cloud service backend 239, and other components. The cloud level resource scheduler 230 can include a portion of a DRS service or elastic DRS service that is executed at a cloud level and can manage SDDCs 151 for multiple enterprises.

The update instructions 233 can include a remote code execution command or another type of command to update management components such as the SDDC management components 206 and the host level management components 221 for each host 115. The update instructions 233 can include the updated management components within the request, or can specify a network location or endpoint such as a URL where the updated management components can be retrieved by the SDDC level workload 209.

The cloud management service 120 can generate the update instructions based on an identification that updates are available. For example, updated management components can be identified as being placed in a data store associated with updates or can be uploaded to the cloud management service 120 by an enterprise administrator or by an administrator associated with a service provider of the cloud management service 120. The instructions can be transmitted to a SDDC 151 through its SDDC level workload 209 according to a schedule that is generated by the cloud management service 120, for example, automatically or as specified through a console user interface of the cloud management service 120.

The cloud service backend 239 can include one or more server banks, computer banks, computing clusters, or other arrangements. The cloud service backend 239 can include datastores as well as software executed to support operations of the cloud management service 120. The cloud service backend 239 can include first party and third party hardware and software components in various arrangements. While shown as separate components, the update instructions 233, and the DRS data endpoint 236 can be considered components of the cloud level resource scheduler 230 and the cloud management service 120.

Steps 1 to 15 are provided as a nonlimiting example of cluster capacity management an update to an infrastructure that includes the SDDC 151. In step 1, the cloud management service 120 can transmit a command to update a SDDC 151. The command can include update instructions 233. The SDDC level workload 209 can receive the update command for the SDDC 151.

In step 2, the SDDC level workload 209 can transmit instructions that invoke an enter cluster maintenance mode functionality, such as an enter cluster maintenance mode API, or another software component or portion of the SDDC level resource scheduler 212 that provides the functionality. The enter cluster maintenance mode API can be an API exposed by the SDDC level resource scheduler 212.

The enter cluster maintenance mode API can be an internal API that requires system level privileges for invocation, and is not exposed to external users or non-system level users. The enter cluster maintenance mode API can include a Restful state transfer (REST) API exposed using a RESTful interface for use by components or services of the management service 120. The RESTful interface can be based on a library definition associated with a container service of the management service 120.

An enter cluster maintenance mode component can be invoked using commands in a command line interface. The SDDC level workload 209 can generate command line commands invoke the enter cluster maintenance mode functionality of the SDDC level resource scheduler 212. Additionally or alternatively, the SDDC level workload 209 can execute a script or other instructions that generates command line commands or otherwise invokes the enter cluster maintenance mode component.

This enables a more intelligent cluster level decision on whether each cluster 145 in a SDDC 151 has sufficient available capacity to perform the update, or whether an unbilled host 115 should be added to the cluster 145 in order to ensure no drop in quality of service as hosts 115 are sequentially updated within each cluster 145. The various clusters 145 can be updated simultaneously, so hosts 115 on different clusters 145 can be simultaneously updated.

The enter cluster maintenance mode API can take a cluster identifier for the cluster 145 as a parameter. The cluster maintenance mode API can include bulk reference and can take multiple cluster identifiers for the clusters 145 of the SDDC 151. In other cases, the SDDC level workload 209 can invoke the cluster maintenance mode API multiple times for the various clusters 145. The SDDC level workload 209 can invoke the cluster maintenance mode API simultaneously, sequentially, and with partial concurrence depending on a schedule or contingent on events indicated by the update instructions 233.

Accordingly, the enter cluster maintenance mode API can be cluster-specific, enabling a more efficient process than existing technologies, where SDDC level instructions can indiscriminately add hosts 115 to the SDDC 151, one host 115 to each cluster 145, and then remove the same hosts 115 once the overall update to the SDDC 151 is completed across all hosts 115 of all clusters 145. For example, the enter cluster maintenance mode API can enable the SDDC level resource scheduler 212 to reduce the number of added hosts 115, thereby reducing the power usage and data transfer within that cluster 145, and preventing the need to later migrate enterprise processes off unnecessarily added hosts 115, once updates are completed.

The SDDC level resource scheduler 212 can monitor hosts 115 of each cluster 145 in the SDDC 151 to identify resource usage data. The SDDC level resource scheduler 212 can store this data in a manner that generates or makes available cluster level or cluster specific resource usage data. This can include resource usage, total resource capacity, available capacity, scheduled enterprise processes scheduled to be executed in each cluster 145 during an expected update time period for the cluster, historical usage for days, months, and times of day for the expected update time period, and other metrics. The SDDC level resource scheduler 212 can analyze cluster level resource usage data at update time, or the time when the enter cluster maintenance mode API is invoked for a particular cluster 145.

The enter cluster maintenance mode API can take a cluster identifier as an input parameter to generate either a scale out decision indicating that an additional host is to be added to the cluster for the host level update, or a cluster ready decision indicating that available cluster capacity is sufficient to perform the host level update. Since the host 115 is added for update purposes, the scale out decision can be referred to as an update-based scale out decision, or an unbillable scale out decision. If the cluster 145 has sufficient available capacity to shut down at least one host 115 and still maintain a particular quality of service or threshold level of resource availability for current and currently scheduled enterprise processes, then the cluster ready decision can be generated. Otherwise, the scale out decision can be generated.

If the cluster has sufficient capacity, then the enter cluster maintenance mode API can return an indication that the cluster 145 is prepared for the update. In this example, however, the SDDC level resource scheduler 212 can make a decision to scale out or add an additional host 115 to the cluster 145 for the update. In any case, the SDDC level resource scheduler 212 can return an indication that the API was successfully invoked.

In step 3, the SDDC level resource scheduler 212 can provide the scale out decision to the cloud level resource scheduler 230 of the cloud management service 120 using the reporting service 215. The scale out decision can specify or otherwise be associated with a cluster identifier of a cluster 145 of the SDDC level resource scheduler 212.

In step 4, the reporting service 215 can identify or receive DRS data that includes the scale out decision and transmit the DRS data to the DRS data endpoint 236. In some cases, the DRS data endpoint 236 periodically polls for and retrieves the DRS data from the reporting service 215.

In step 5, the DRS data endpoint 236 or associated instructions can invoke a cluster scaling API provided by the cloud level resource scheduler 230. In some cases, the API can be invoked using a parameter that specifies the cluster 145 or an identifier of the cluster 145. The cluster scaling API can also be invoked using a parameter that indicates to expand the cluster 145 to include an additional host 115. The cluster scaling API can in some cases be an update-specific cluster scaling API, where the added host 115 is understood to be unbillable. In other cases, the cluster scaling API can be invoked using a parameter that indicates the additional host 115 is for updates, and should be unbillable.

In step 6, the cloud level resource scheduler 230 can store a record of the additional host 115, the billing status of that host 115, and other data in the SDDC deployment record 136. The cloud level resource scheduler 230 can also implement the addition of the host using a cloud service backend 239.

In step 7, the cloud level resource scheduler 230 can directly, or through the cloud service backend 239, transmit an add host command to the SDDC level workload 209. The add host command can specify a cluster 145 to which a host 115 is to be added. For example, the add host command can include the cluster identifier of a cluster 145 that was included in the instructions that invoked the enter cluster maintenance mode API.

In step 8, the SDDC level workload 209 can add a host 115 to the specified cluster 145. For example, the SDDC level workload 209 can identify an available host 115 from a pool of hosts 115 accessible by the SDDC 151 and assign that host 115 to the cluster 145.

In step 9, the SDDC level workload 209 can update hosts 115 for the cluster 145 specified to invoke the enter cluster maintenance mode API. The SDDC level workload 209 can place the host 115a in a host maintenance mode, which takes the host 115a offline for the purposes of contributing resource capacity to the cluster 145. The SDDC level workload 209 can update the host level management components 221 once the host 115a is in host maintenance mode. Once the host level management components 221 are updated, the host 115a can be brought online and into an operational mode. The SDDC level workload 209 can then move to the next host 115b, and so on until all hosts 115 of the cluster 145 are updated.

In step 10, the SDDC level workload 209 can invoke an exit cluster maintenance mode functionality, such as an exit cluster maintenance mode API, or another software component or portion of the SDDC level resource scheduler 212 that provides the functionality. Like the enter cluster maintenance mode API, the exit cluster maintenance mode API takes a cluster identifier as a parameter. The exit cluster maintenance mode API can then analyze current resource usage and capacity of the specified cluster 145 and determine whether to remove a host 115 from the cluster or expand the cluster 145 to include the additional host 115 that was previously added for the update.

Since the exit cluster maintenance mode API is cluster-specific, and takes a cluster identifier as a parameter, a host 115 can be removed once the hosts 115 limited to the specified cluster 145 are fully updated, rather than all hosts of all clusters 145. This can reduce the amount of time that an additional and unbillable host 115 is provided to the cluster 145. This can reduce power usage as compared to existing technologies where the additional host 115 can remain until all clusters 145 are updated. In addition, this can reduce the number of data objects that are moved to the additional host 115 since data can increase with time, thereby reducing the data transfer required to remove that host 115. As a result, if the cluster 145 has a relatively small number of hosts 115, then the same host 115 may be removed once the update is completed, since less data and fewer workloads can be assigned to that host 115 over a short period of time.

The exit cluster maintenance mode API of the SDDC level resource scheduler 212 also provides benefits over existing technologies for larger clusters 145 with a higher number of hosts 115, and other situations where the previously added host 115 is fully consumed. The previously added host 115 was added as a temporary and unbillable host 115. The exit cluster maintenance mode API does not blindly remove this host 115, but rather determines based on current resource usage whether the cluster 145 should be expanded to include the additional host 115. Enterprises can continue to use the cluster for enterprise workloads and can expand the number or usage of current workloads. If the SDDC level resource scheduler 212 predicts that removal of a host 115 will result in a reduction of quality of service in view of current workloads, or resource usage will cross one or more thresholds, then the exit cluster maintenance mode API can expand the cluster 145 to include the additional host 115; the billable status of the additional host 115 can also change from unbilled to billed. The expansion of the cluster during upgrade time by the exit cluster maintenance mode API can prevent the overhead of existing technologies that remove the same host 115 that was added, reducing quality of service momentarily until the DRS adds another host 115 to overcome the quality of service reduction.

If the SDDC level resource scheduler 212 predicts that quality of service will remain unaffected by the removal of a host 115, then the exit cluster maintenance mode API can identify a host 115 that has a lowest resource cost for removal. Lowest resource cost for removal can be based on network usage, data transferred, processor usage, and other resources. As a result, if the additional unbilled host 115 has a higher resource cost for removal, then it can be added as a billable host 115 and another host 115 can be removed, causing the number of billed hosts 115 to remain the same. This can provide efficiency benefits. For example, network usage, data transferred, processor usage, and other resource usage for removing a host 115 from the cluster 145 is minimized. If user workload increases during the cluster update process thus consuming the additional non billable host 115 added before the cluster update. This process can convert the host 115 as billable as now customer is completely using the host 115.

Returning to the example steps, in step 11, the SDDC level resource scheduler 212 generates the expand or scale in decision. In step 12, the reporting service 215 identifies the expand or scale in decision and transmits the decision to the DRS data endpoint 236.

In step 13, the DRS data endpoint 236 or a related process invokes the cluster scaling API. The cluster scaling API can be invoked using parameters that indicate a particular cluster 145 and a particular host 115 by respective identifiers. If the cluster 145 is to be expanded, then an expand or state change API can be invoked to expand the specified cluster 145 to include the specified additional host 115 and change its state to billed. In some cases, a single cluster scaling API can perform this functionality based on a parameter that indicates to add any host, remove a specified host, or include a specified host 115 and change its state to billed.

In step 14, the cloud level resource scheduler 230 can implement the decision to expand or remove a host 115 according to the parameters provided to the cluster scaling API. For example, the cloud level resource scheduler 230 can use the cloud service backend 239 or other components of the cloud management service 120.

In step 15, if a host 115 is to be removed, the cloud service backend 239 or other components of the cloud management service 120 can transmit a remove host command to the SDDC level workload 209. The remove host command can specify the cluster 145 as well as the host 115 to remove.

In step 16, the SDDC level workload 209 can remove the host 115. This can complete the update process with respect to the cluster 145. However, additional clusters 145 can remain in the update process guided by the SDDC level workload 209.

Figure 3:
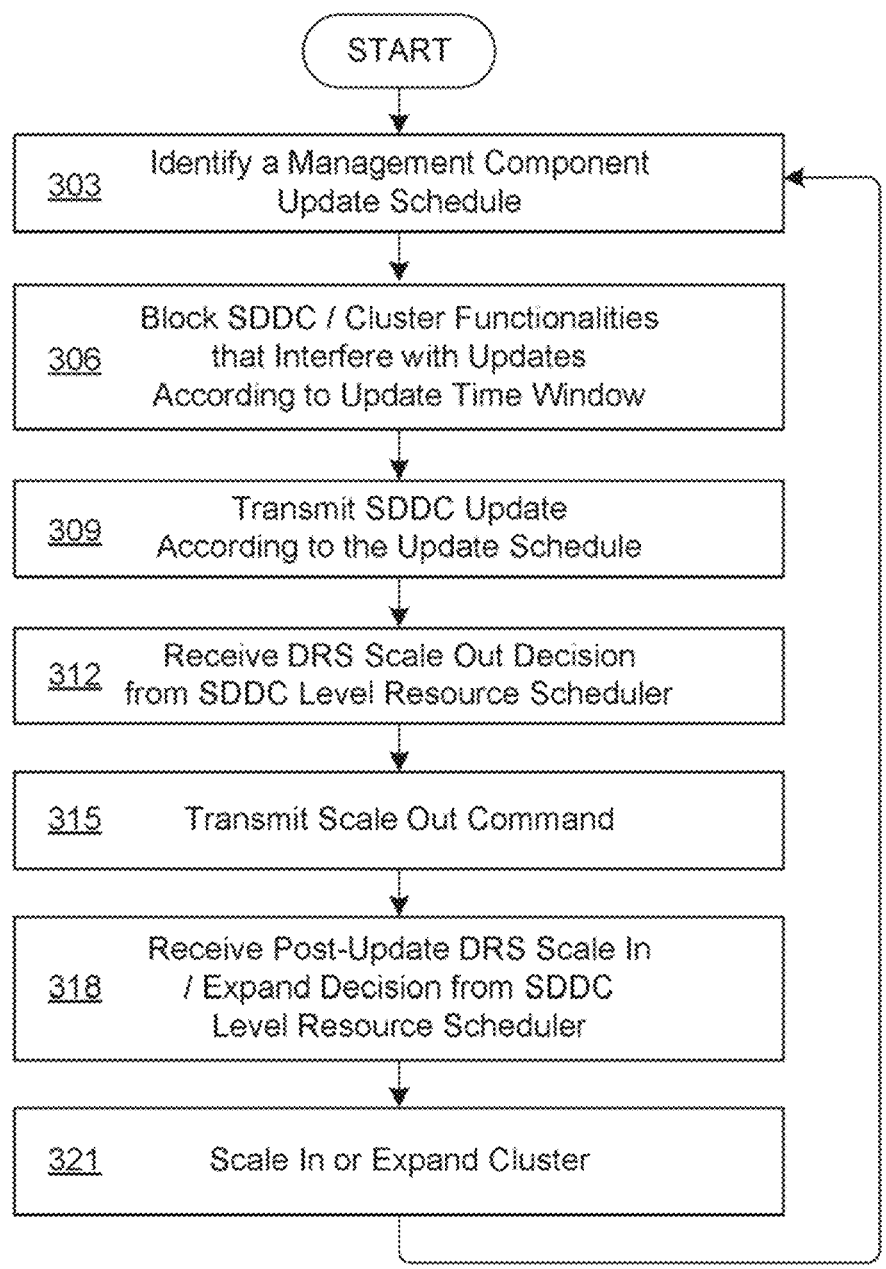
FIG. 3 is a flowchart that describes functionalities of components of the networked environment to provide cluster capacity management for infrastructure updates.

FIG. 3 is a flowchart that describes functionalities of components of the networked environment 100 to provide cluster capacity management for infrastructure updates. While the flowchart discusses actions as performed by the cloud management service 120, certain aspects can be performed by other components of the networked environment.

In step 303, the cloud management service 120 can identify a management component update schedule. A schedule of updates can include host level updates for a set of host level management components 221. The schedule of updates can be fed into the cloud management service 120. The schedule of updates can be uploaded or transmitted to the cloud management service 120 or can be designed and saved using a console user interface of the cloud management service 120. The schedule of updates can specify a time window for updates that includes an update time for one or more of a SDDC 151, and the clusters 145 of the SDDC 151.

In step 306, the cloud management service 120 can block SDDC and cluster level functionalities that interfere with the schedule of updates. For example, the cloud management service 120 can transmit instructions to the SDDC management components 206 of specified clusters 145 to disable scaling in of hosts 115, cross-cluster workload transfers, cross-SDDC workload transfers, and other actions that interfere with a host level update based on an update window of the schedule of updates.

In step 309, the cloud management service 120 can transmit a SDDC update command to a SDDC 151 according to the update window. The cloud management service 120 can transmit the SDDC update command to a SDDC level workload 209 or a point of delivery for a control plane of the SDDC 151. The SDDC update command can include the SDDC level workload 209, or instructions for a SDDC level workload 209 to perform the host level update. The SDDC update command can indicate to update all hosts 115 of all clusters 145 of the SDDC 151. This can cause the SDDC level workload 209 to invoke an enter cluster maintenance mode API of a SDDC level resource scheduler 212 using a parameter that identifies a cluster 145.

In step 312, the cloud management service 120 can receive a scale out decision generated by the SDDC level resource scheduler 212 for the cluster 145. The scale out decision can be a cluster-specific scale out decision since the scale out decision can be received along with an identifier of the cluster 145 to scale out. Scaling out the cluster 145 can include adding a host 115 to the cluster 145 for update purposes. As a result, the host 115 can be flagged or otherwise indicated as an unbilled host 115.

In step 315, the cloud management service 120 can transmit a scale out command to the SDDC level workload 209. The SDDC level workload 209 can process the command to add a host 115 to a cluster 145 specified in the command. The SDDC level workload 209 can select a host 115 from a pool of hosts 115 and assign it to the cluster 145. The SDDC level workload 209 can then update the hosts 115 of the cluster 145. Once all hosts 115 of the cluster 145 are updated, the SDDC level workload 209 can invoke an exit cluster maintenance mode API of the SDDC level resource scheduler 212, identifying the cluster 145 as a parameter.

In step 318, the cloud management service 120 can receive a post-update DRS decision generated by the SDDC level resource scheduler 212 and transmitted by the SDDC level resource scheduler 212 or another component of the SDDC 151 control plane. The post-update DRS decision can include a scale in decision or an expand decision. The scale in decision can specify a lowest-resource cost host 115 to remove from a specified cluster 145. The expand decision can specify to convert the additional and unbilled host 115 to a billed host 115. This expands the deployment of hosts 115, since the unbilled host was previously added as an unbilled host and provided to prevent a decreased quality of service during the update. If the post-update DRS decision is an expand cluster decision, then the cloud management service 120 can change the corresponding status of the specified host 115, and no further action is required for the update process with respect to the specified cluster 145.

In step 321, if the post-update DRS decision is a scale in decision, the cloud management service 120 can transmit a scale in command to the SDDC level workload 209. The scale in command can specify the lowest-resource cost host 115 and the cluster 145. The SDDC level workload 209 can remove the specified host 115 from the cluster 145 and place it in a pool of available hosts 115. Alternatively, the DRS decision can be an expand cluster decision. The expand cluster decision can be referred to as a state change decision, since the cluster already includes the unbillable host 115, and the expansion of the cluster involves a logical state change from a temporary unbilled host 115 for processing an update to a billed host 115 for enterprise processes.

Figure 4:
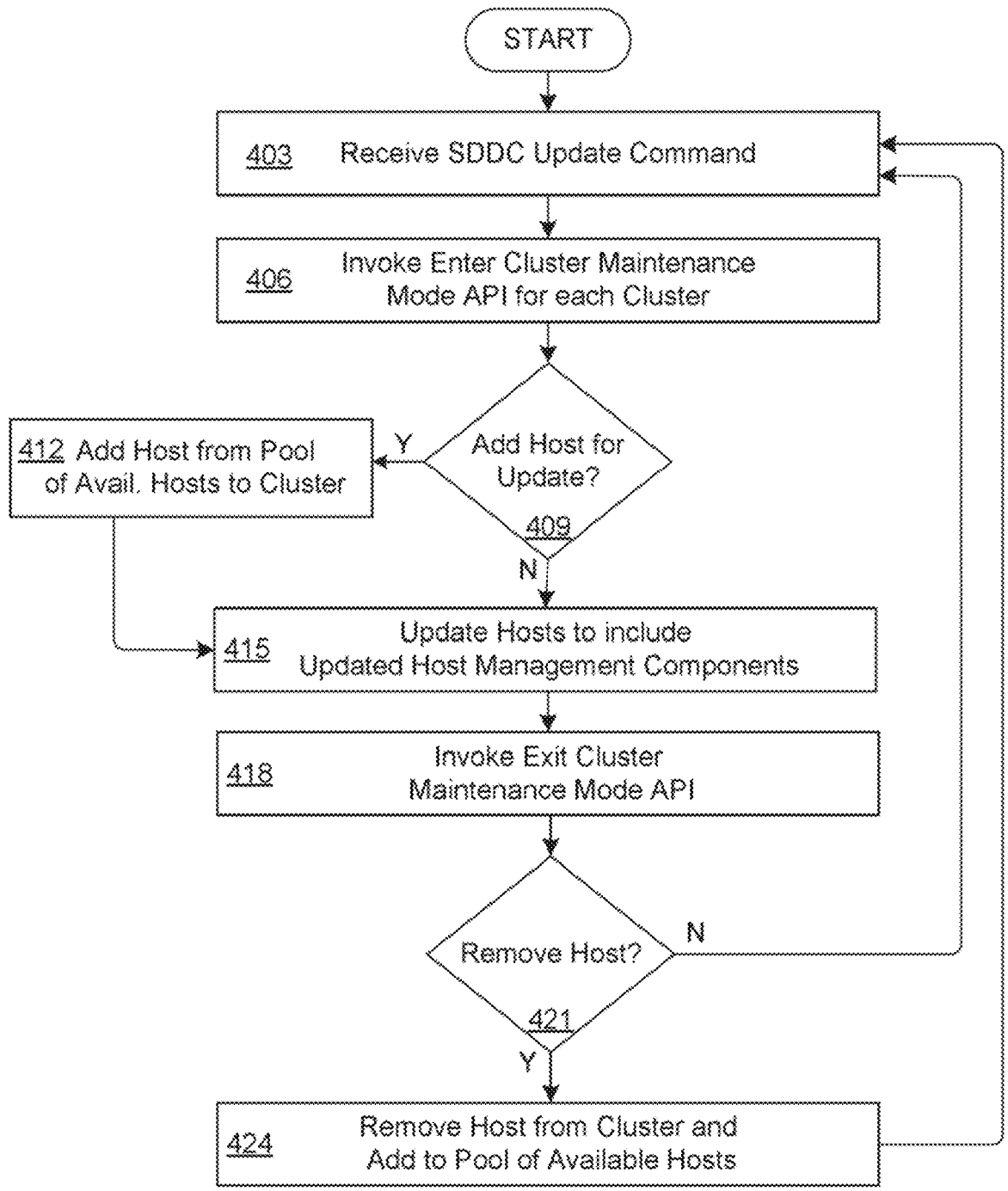
FIG. 4 is another flowchart that describes functionalities of components of the networked environment to provide cluster capacity management for infrastructure updates.

FIG. 4 is a flowchart that describes functionalities of components of the networked environment 100 to provide cluster capacity management for infrastructure updates. While the flowchart discusses actions as performed by the SDDC level workload 209, certain aspects can be performed by other components of the networked environment.

In step 403, the SDDC level workload 209 can receive a SDDC update command. The SDDC update command can specify to update all hosts 115 of all clusters 145 of the SDDC 151. In some examples, the SDDC update command can also include instructions to block SDDC and cluster level functionalities that interfere with the schedule of updates prior to performing the update. In other situations, these can include separate commands.

In step 406, the SDDC level workload 209 can invoke an enter cluster maintenance mode API of a SDDC level resource scheduler 212 using a parameter that identifies each of the clusters 145 of that SDDC 151. The SDDC level workload 209 can disable any specified SDDC and cluster level functionalities prior to invoking the enter cluster maintenance mode API. The SDDC level resource scheduler 212 can return an indication that the API is successfully invoked. In some cases, the SDDC level resource scheduler 212 can also return an indication that the cluster 145 is ready for the upgrade, for example, if an additional host 115 is unrequired for the upgrade.

In step 409, the SDDC level workload 209 can determine whether to add a host for the update. The decision of whether to add a host 115 can be performed by the SDDC level resource scheduler 212. An indication of the decision is transmitted to the cloud management service 120 to recordation and other purposes. The SDDC level workload 209 can determine that a host 115 should be added based on whether an add host command is received from the cloud management service 120. If an add host command is received, then the process can move to step 412. If no add host command is received within a specified time window after an indication that the API is successfully invoked, or if the SDDC level resource scheduler 212 provides an indication that the cluster 145 is ready for upgrade, then the process can move to step 415.

In step 412, the SDDC level workload 209 can add a host 115 to the cluster 145. The SDDC level workload 209 can select an available host 115 from a pool of hosts 115 and can assign the selected host 115 to the cluster 145.

In step 415, the SDDC level workload 209 can update hosts 115 of the cluster 145. The SDDC level workload 209 can place a host 115 in a host maintenance mode. This can migrate all workloads and data to other hosts 115 of the cluster and take the host 115 offline for the purposes of contributing resource capacity to the cluster 145. The SDDC level workload 209 can install updated host level management components 221 once the host 115 is in host maintenance mode. Once the updated host level management components 221 are installed, the host 115 can be brought online and made available to provide resources for cluster workloads. The SDDC level workload 209 can then move to the next host 115, and so on until all hosts 115 of the cluster 145 are updated.

In step 418, the SDDC level workload 209 can invoke an exit cluster maintenance mode API of the SDDC level resource scheduler 212. The exit cluster maintenance mode API can analyze current resource usage and capacity of the specified cluster 145, and determine whether to remove a host 115 from the cluster or expand the cluster 145 to include the additional host 115 that was previously added for the update.

In step 421, the SDDC level workload 209 can determine whether to remove a host 115 after the update. The decision of whether to remove a host 115 can be performed by the SDDC level resource scheduler 212. An indication of the decision is transmitted to the cloud management service 120 to recordation and other purposes. The SDDC level workload 209 can determine that a host 115 should be removed based on whether a remove host command is received from the cloud management service 120. If a remove host command is received, then the process can move to step 424.

In step 424, the SDDC level workload 209 can remove a host from the cluster 145. The remove host command can specify a cluster 145 and a particular host 115 to remove. The specified host 115 can correspond to the host 115 identified by the SDDC level resource scheduler 212 to have a lowest resource cost for removal from the cluster 145. The workloads and data assigned to that host 115 can be migrated to other hosts 115 of the cluster 145, and the host 115 can be added to a pool of available hosts 115.

Figure 5:
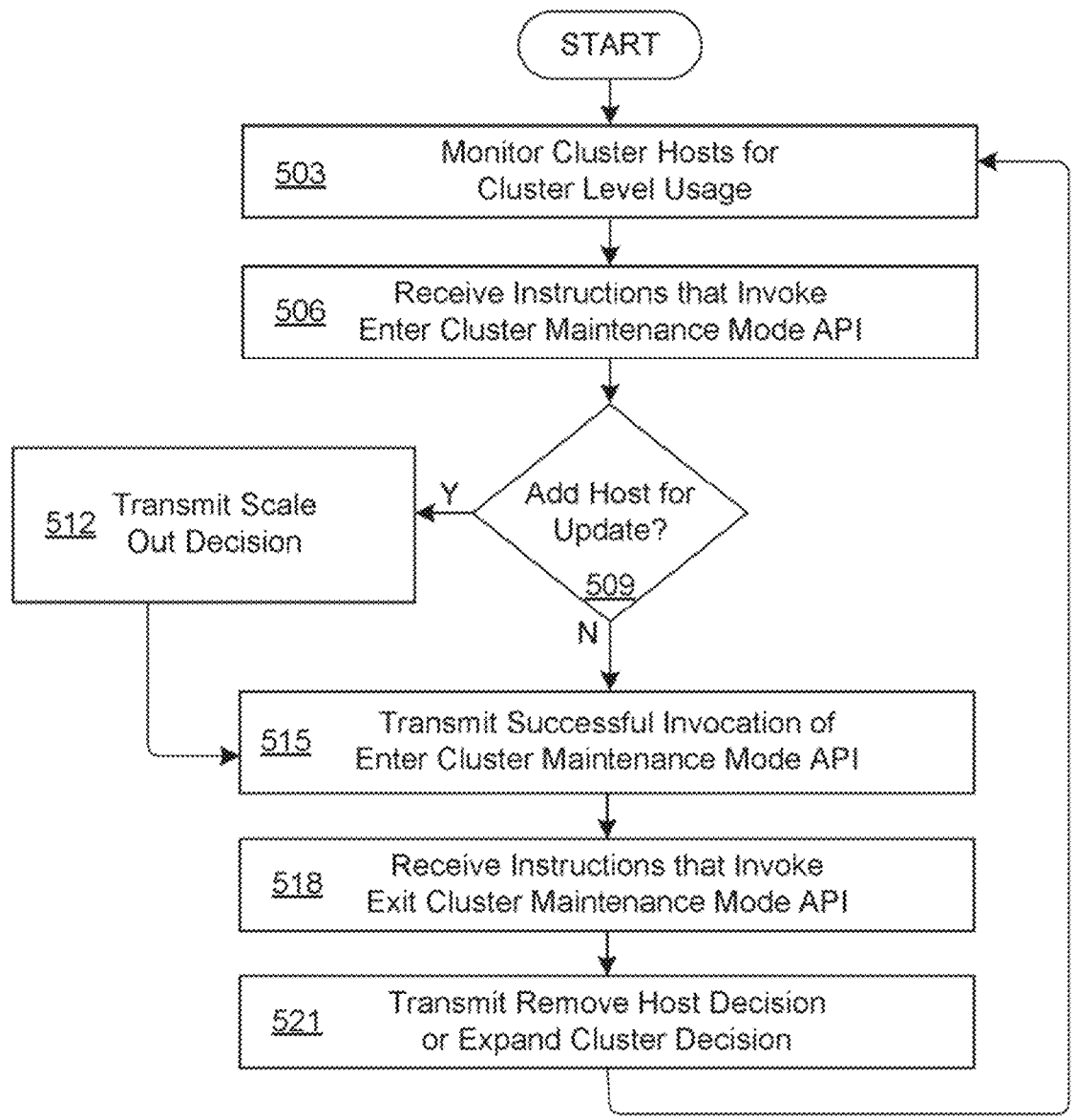
FIG. 5 is another flowchart that describes functionalities of components of the networked environment to provide cluster capacity management for infrastructure updates.

FIG. 5 is another flowchart that describes functionalities of components of the networked environment 100 to provide cluster capacity management for infrastructure updates. While the flowchart discusses actions as performed by the SDDC level resource scheduler 212, certain aspects can be performed by other components of the networked environment.

In step 503, the SDDC level resource scheduler 212 can monitor hosts 115 of each cluster 145 in its SDDC 151 for each host 115, for the cluster 145, and for the SDDC 151 overall. The SDDC level resource scheduler 212 can store usage data in a manner that generates or makes available cluster level or cluster specific resource usage data. This can include resource usage, total resource capacity, available capacity, scheduled enterprise processes scheduled to be executed in each cluster 145 during an expected update time period for the cluster, historical usage for days, months, and times of day for the expected update time period, and other metrics.

In step 506, the SDDC level resource scheduler 212 can receive instructions that invoke an enter cluster maintenance mode API. The enter cluster maintenance mode API can be an API exposed by the SDDC level resource scheduler 212. The enter cluster maintenance mode API can take a cluster identifier as an input parameter to generate either a scale out decision indicating that an additional host is to be added to the cluster for the host level update, or a cluster ready decision indicating that available cluster capacity is sufficient to perform the host level update.

In step 509, the SDDC level resource scheduler 212 can determine whether to add a host 115 to the cluster 145 for an update. For example, in response to the enter cluster maintenance mode API being invoked, the SDDC level resource scheduler 212 can analyze the cluster level resource usage for the cluster 145 to determine whether the cluster 145 has sufficient available capacity to maintain a particular quality of service or threshold level of resource availability as the update is applied. If the cluster 145 has sufficient available capacity, then a cluster ready decision can be generated and the process can move to step 515. Otherwise, the scale out or add host decision can be generated and the process can move to step 512.

In step 512, the SDDC level resource scheduler 212 or other SDDC management components 206 transmit the scale out decision to the cloud management service 120. The scale out decision can specify the cluster 145 to which a host 115 should be added. In some cases, the scale out decision can also indicate that the host 115 should be added for an update, or that the host 115 is to be added as an unbilled host 115.

In step 515, the SDDC level resource scheduler 212 can transmit, to the SDDC level workload 209, an indication that the enter cluster maintenance mode API is successfully invoked. In some cases, such as when no host 115 is required to maintain quality of service for the cluster 145, then the SDDC level resource scheduler 212 can also transmit an indication that the cluster 145 is ready for an update to be applied.

In step 518, the SDDC level resource scheduler 212 can receive instructions that invoke an exit cluster maintenance mode API. The exit cluster maintenance mode API can be an API exposed by the SDDC level resource scheduler 212. The exit cluster maintenance mode API can take a cluster identifier as an input parameter to generate either a scale in decision indicating a host 115 that is identified to have a lowest resource cost for removal based on the cluster level resource usage data at the time the API is invoked, or an expand cluster decision indicating that available cluster capacity is sufficient to perform the host level update.

In step 521, the SDDC level resource scheduler 212 can transmit the scale in decision or the expand cluster decision to the cloud management service 120.

Although the various software components described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show examples of the functionality and operation of various implementations of portions of components described in this application. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

What is claimed is:

1. A system, comprising:
   at least one computing device comprising at least one processor;
   instructions stored in at least one memory, wherein the instructions, when executed by the at least one processor, cause the at least one computing device to at least:
   monitor, by a datacenter level resource scheduler of a hyperconverged environment, a plurality of hosts of a plurality of clusters of the hyperconverged environment to identify cluster specific resource usage data;

receive, by the datacenter level resource scheduler from a datacenter level workload that performs a host level update for the plurality of clusters, instructions that invoke an enter cluster maintenance mode component of the datacenter level resource scheduler using a parameter identifies a specified cluster;

analyze, by the datacenter level resource scheduler, the cluster specific resource usage data to identify, for the specified cluster, a cluster scaling decision comprising one of: a scale out decision to add an additional host to the specified cluster, or a cluster ready decision;

transmit, by the datacenter level resource scheduler, an indication that the enter cluster maintenance mode functionality is successfully invoked, wherein the datacenter level workload performs the host level update;

receive, by the datacenter level resource scheduler from the datacenter level workload, instructions that invoke an exit cluster maintenance mode component of the datacenter level resource scheduler; and transmit, based at least in part on an analysis of the cluster specific resource usage data, an expand cluster decision to a cloud level resource scheduler, wherein the additional host is converted from an unbillable host to a billable host based at least in part on the expand cluster decision.

2. The system of claim 1, wherein the instructions, when executed by the at least one processor, cause the at least one computing device to at least:

transmit the scale out decision to a cloud level resource scheduler of a distributed resource scheduler comprising the datacenter level resource scheduler and the cloud level resource scheduler.

3. The system of claim 1, wherein the enter cluster maintenance mode component corresponds to an enter cluster maintenance mode application programming interface (API).

4. The system of claim 1, wherein the exit cluster maintenance mode component corresponds to an exit cluster maintenance mode application programming interface (API).

5. The system of claim 1, wherein the host level update comprises a firmware update.

6. The system of claim 1, wherein the particular host is removed and the additional host remains in the specified cluster.

7. The system of claim 1, wherein the datacenter level workload performs the host level update for a plurality of hosts of the specified cluster.

8. A method comprising:

monitoring, by a datacenter level resource scheduler of a hyperconverged environment, a plurality of hosts of a plurality of clusters of the hyperconverged environment to identify cluster specific resource usage data;

receiving, by the datacenter level resource scheduler from a datacenter level workload that performs a host level update for the plurality of clusters, instructions that invoke an enter cluster maintenance mode component of the datacenter level resource scheduler using a parameter identifies a specified cluster;

analyzing, by the datacenter level resource scheduler, the cluster specific resource usage data to identify, for the specified cluster, a cluster scaling decision comprising one of: a scale out decision to add an additional host to the specified cluster, or a cluster ready decision;

transmitting, by the datacenter level resource scheduler, an indication that the enter cluster maintenance mode component is successfully invoked, wherein the datacenter level workload performs the host level update;

receiving, by the datacenter level resource scheduler from the datacenter level workload, instructions that invoke an exit cluster maintenance mode component of the datacenter level resource scheduler; and transmitting a scale in decision to a cloud level resource scheduler, the scale in decision comprising an identifier of a particular host to remove from the specified cluster, wherein the particular host is associated with a lowest removal resource cost among a plurality of hosts of the specified cluster.

9. The method of claim 8, further comprising:

transmitting the scale out decision to a cloud level resource scheduler of a distributed resource scheduler comprising the datacenter level resource scheduler and the cloud level resource scheduler.

10. The method of claim 8, wherein the enter cluster maintenance mode component corresponds to an enter cluster maintenance mode application programming interface (API).

11. The method of claim 8, wherein the exit cluster maintenance mode component corresponds to an exit cluster maintenance mode application programming interface (API).

12. The method of claim 8, wherein the host level update comprises a firmware update.

13. The method of claim 8, wherein the particular host is removed and the additional host remains in the specified cluster.

14. The method of claim 8, wherein the datacenter level workload performs the host level update for a plurality of hosts of the specified cluster.

15. A non-transitory computer-readable medium comprising machine readable instructions, wherein the instructions, when executed by at least one processor, cause at least one computing device to at least:

monitor, by a datacenter level resource scheduler of a hyperconverged environment, a plurality of hosts of a plurality of clusters of the hyperconverged environment to identify cluster specific resource usage data;

receive, by the datacenter level resource scheduler from a datacenter level workload that performs a host level update for the plurality of clusters, instructions that invoke an enter cluster maintenance mode component of the datacenter level resource scheduler using a parameter identifies a specified cluster;

analyze, by the datacenter level resource scheduler, the cluster specific resource usage data to identify, for the specified cluster, a cluster scaling decision comprising one of: a scale out decision to add an additional host to the specified cluster, or a cluster ready decision;

transmit, by the datacenter level resource scheduler, an indication that the enter cluster maintenance mode component is successfully invoked, wherein the datacenter level workload performs the host level update;

receive, by the datacenter level resource scheduler from the datacenter level workload, instructions that invoke an exit cluster maintenance mode component of the datacenter level resource scheduler; and transmit, by the datacenter level resource scheduler, one of:

an expand cluster decision to a cloud level resource scheduler, wherein the additional host is converted from an unbillable host to a billable host based at least in part on the expand cluster decision, or a scale in decision to a cloud level resource scheduler, the scale in decision comprising an identifier of a particular host to remove from the specified cluster, wherein the particular host is associated with a lowest removal resource cost among a plurality of hosts of the specified cluster.

16. The non-transitory computer-readable medium of claim 15, wherein the instructions, when executed by the at least one processor, cause the at least one computing device to at least:

transmit the scale out decision to a cloud level resource scheduler of a distributed resource scheduler comprising the datacenter level resource scheduler and the cloud level resource scheduler.

17. The non-transitory computer-readable medium of claim 15, wherein the enter cluster maintenance mode component corresponds to an enter cluster maintenance mode application programming interface (API).

18. The non-transitory computer-readable medium of claim 15, wherein the exit cluster maintenance mode component corresponds to an exit cluster maintenance mode application programming interface (API).

19. The non-transitory computer-readable medium of claim 15, wherein the host level update comprises a firmware update.

20. The non-transitory computer-readable medium of claim 15, wherein the datacenter level workload performs the host level update for a plurality of hosts of the specified cluster.

* * * * *